(12) United States Patent
Meijer et al.

(10) Patent No.: US 7,937,694 B2
(45) Date of Patent: May 3, 2011

(54) FAST FLATTENING OF NESTED STREAMS

(75) Inventors: Henricus Johannes Maria Meijer, Mercer Island, WA (US); Wolfram Schulte, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1061 days.

(21) Appl. No.: 10/778,793

(22) Filed: Feb. 13, 2004

(65) Prior Publication Data

US 2005/0183058 A1    Aug. 18, 2005

(51) Int. Cl.
G06F 9/44        (2006.01)
G06F 9/45        (2006.01)

(52) U.S. Cl. .................... 717/151; 717/114; 717/140

(58) Field of Classification Search .......... 717/140–141, 717/151; 709/230–236
See application file for complete search history.

(56) References Cited

U.S. PATENT DOCUMENTS

| | | | | |
|---|---|---|---|---|
| 6,006,230 A * | 12/1999 | Ludwig et al. | .................. | 707/10 |
| 6,018,628 A * | 1/2000 | Stoutamire | .................. | 717/147 |
| 6,826,763 B1 * | 11/2004 | Wang et al. | .................. | 719/330 |
| 2004/0194058 A1 * | 9/2004 | Meijer et al. | .................. | 717/116 |
| 2004/0255018 A1 * | 12/2004 | Taraci | .......................... | 709/223 |

OTHER PUBLICATIONS

Guido vanRossum "Flattening Python Objects", 1994, downloaded from http://www.python.org/workshops/1994-11/FlattenPython.html on Jul. 21, 2007.*
Guido vanRossum "Flattening Algorithm", 1994, downloaded from http://www.python.org/workshops/1994-11/flatten.py on Jul. 21, 2007.*
Raymond Toy "5.5 Tail Recursion", 1997, downloaded from http://.umiacs.umd.edu/~resnik/ling645_sp2002/cmu_manual/node140.html on Jul. 21, 2007.*
Yang "Interface, IEnumerable and IEnumerator in C#" 2002 available at <http://www.devarticles.com/c/a/C-Sharp/Interface-IEnumerable-and-IEnumerator-in-C-sharp/> as of Jul. 9, 2009.*
"Turing Completeness", wikipedia Retrieved Jul. 8, 2009 from <http://en.wikipedia.org/wiki/Turing_completeness>.*
Mertz, "Charming Python #b13: The itertools Module, Functional programming in Python becomes lazy", 2003 available at <http://gnosis.cx/publish/programming/charming_python_b13.html> as of Jul. 9, 2009.*
Bender, "Using a Stack to Implement Recursion", Apr. 2000, downloaded from <http://mitpress.mit.edu/sicp/full-text/sicp/book/node110.html>.*
Blelloch et al. "Implementation of a Protable Nexted Data Parallel Language" Feb. 1993 School of Computer Science Carnegie Mellon University.*

(Continued)

*Primary Examiner* — Jason Mitchell
(74) *Attorney, Agent, or Firm* — Klarquist Sparkman, LLP

(57) ABSTRACT

Techniques and tools are described for flattening nested streams. For example, a stream flattening tool processes nested streams on a stack to traverse the nested streams. The tool produces a flattened stream that enumerates the elements of the nested streams. In one embodiment, the tool initially pushes a stack frame onto the stack for a stream representing all of the nested streams. As the tool iterates across the "active" stream having the frame on the top of the stack, the tool may encounter and produce elements in the "active" stream. Or, the tool may encounter a nested stream and push a stack frame for the nested stream onto the stack, then continuing by iterating across the new active stream. The tool pops the stack frame for the active stream from the stack when the end of the stream is reached, or potentially earlier if handling a nested tail stream.

23 Claims, 9 Drawing Sheets

OTHER PUBLICATIONS

"Lazy evaluation," *Wikipedia*, 4 pages, Retrieved Mar. 24, 2009, from <http://en.wikipedia.org/wiki/Lazy_evaluation>.

"Standard streams," *Wikipedia*, 5 pages, Retrieved Mar. 24, 2009, from <http://en.wikipedia.org/wiki/Standard_streams>.

"Stream (computing)0," *Wikipedia*, 1 page, Retrieved Mar. 24, 2009, from <http://en.wikipedia.org/wiki/Stream_(computing)>.

"Stream Class," *msdn*, 2 pages, Retrieved Mar. 24, 2009, from <http://msdn.microsoft.com/en-us/library/system.io.stream.read(VS.71).aspx>.

"Yet Another Language Geek. All About Iterators," *Welcome to MSDN Blogs*, 11 pages, Retrieved Mar. 24, 2009, from <http://blogs.msdn.com/wesdyer/archive/2007/03/23/all-about-iterators.aspx>.

Jacobs et al., "Iterators Revisited: proof rules and implementation," Workshop on Formal Techniques for Java-like Programs 2005.

ASPRelated.com, "Iteration statements," 6 pages. [Downloaded from the World Wide Web on Jan. 29, 2004.].

ASPRelated.com, "Iterator blocks," 2 pages. [Downloaded from the World Wide Web on Jan. 29, 2004.].

ASPRelated.com, "Enumerator objects," 4 pages. [Downloaded from the World Wide Web on Jan. 29, 2004.].

ASPRelated.com, "Enumerable objects," 2 pages. [Downloaded from the World Wide Web on Jan. 29, 2004.].

ASPRelated.com, "The yield statement," 3 pages. [Downloaded from the World Wide Web on Jan. 29, 2004.].

Microsoft Corporation, "Iterators in C#," 3 pages. [Downloaded from the World Wide Web on Jan. 29, 2004.].

Microsoft Corporation, "yield," 2 pages. [Downloaded from the World Wide Web on Jan. 29, 2004.].

Microsoft Corporation, "foreach, in," 2 pages. [Downloaded from the World Wide Web on Jan. 29, 2004.].

Allen et al., "When to Use Recursion/When to Use Iteration," 2 pages. [Downloaded from the World Wide Web on Feb. 1, 2004.].

Microsoft Corporation, "C# Iterators, Draft 3," pp. 1-14, Sep. 2003.

Meijer et al., "Unifying Tables, Objects and Documents," 24 pp. [Downloaded from the World Wide Web on Jan. 29, 2004.].

Microsoft Corporation, "The C# Programming Language, Future Features," pp. 1-15. [Downloaded from the World Wide Web on Jan. 29, 2004.].

Jacobs et al., "Iterators revisited: proof rules and implementation," *Proceedings of the 7th ECOOP Workshop on Formal Techniques for Java-like Programs*, Jul. 2005, 21 pages.

Dyer, "All About Iterators," downloaded from http://blogs.msdn.com/b/wesdyer/archive/2007/03/23/all-about-iterators.aspx, 9 pages (document marked Mar. 23, 2007).

* cited by examiner 0, 1, 2, 3, 4, 5, 6, 7, 8, 9, 10
1, 2, 3, 4, 5, 6, 7, 8, 9, 10
2, 3, 4, 5, 6, 7, 8, 9, 10
3, 4, 5, 6, 7, 8, 9, 10
4, 5, 6, 7, 8, 9, 10
5, 6, 7, 8, 9, 10
6, 7, 8, 9, 10
7, 8, 9, 10
8, 9, 10
9, 10
10

Figure 1, Prior art

0, FromTo(1, 10)
1, FromTo(2, 10)
2, FromTo(3, 10)
3, FromTo(4, 10)
4, FromTo(5, 10)
5, FromTo(6, 10)
6, FromTo(7, 10)
7, FromTo(8, 10)
8, FromTo(9, 10)
9, FromTo(10, 10)
10

Figure 4

```
public class Tree{
        public Tree l, r;
        public int v;

public Tree(Tree l, int v, Tree r) { this.l = l; this.v = v; this.r = r; } public int* YieldTrav(Tree t){
                if (l!= null)
                        yield return YieldTrav(t.l);
                yield v;
                if (r != null)
                        yield return YieldTrav(t.r);
        } public IEnumerable LazyTrav() {
                return new Enumer (new LazyTrav(this));
        } public interface IStream { object Istream();  } public class LazyTrav:IStream {
                public int pc;
                public Tree t;

public LazyTrav(Tree t) {
                        this.t = t;
                }
        } public object Next() {
                for (;;){
                        switch (pc++) {
                                case 0:
                                        if (t.l != null)
                                                return new LazyTrav(t.l);
                                        break;
                                case 1:
                                        return t.v;
                                case 2:
                                        if (t.r != null)
                                                return new (LazyTrav(t.r);
                                        break;
                                case 3:
                                        return null;
                        }
                }
        }

Tree t1 = new Tree(null, 1, null);
Tree t3 = new Tree(null, 3, null);
Tree t4 = new Tree(t3, 4, null);
Tree t2 = new Tree(t1, 2, t4);
```

```
public class Enumer: IEnumerable, IEnumerator () {
        protected Stack st = null;
        private object current = null;

public Enumer (Istream c) {
            St = new Stack();
            St.Push(c);
    }

IEnumerator: IEnumerable.GetEnumerator(){
            return this;
    } public bool MoveNext() {
            for (;;) {
                    if (St.count == 0)
                            return false;
                    object l = ((IStream) St.Peek()).Next();
                    if (l == null) {
                            St.Pop();
                            continue;
                    } else if (l is IStream){
                            St.Push();
                            continue;
                    } else {
                            current = l;
                            return true;
                    }
            }
    }
}
```

Figure 6C

```
IEnumerator ie = (IEnumerable)(t2.LazyTrav()).GetEnumerator();

while (ie.MoveNext()){
        int i = int ie.current;
        ...;
}
```

FAST FLATTENING OF NESTED STREAMS

TECHNICAL FIELD

The invention relates generally to improving software performance. For example, techniques and tools are described for improving the performance of recursive calls that generate nested streams.

BACKGROUND

Software programming languages have evolved over time. In early machine code languages, computer instructions were written as numbers (machine language) or as human-readable versions of machine language (assembly language). Subsequent programming languages, such as Fortran and COBOL, introduced a measure of abstraction, so that a programmer wrote instructions in a higher-level source language, and a compiler or interpreter was needed to convert the language from the source language to machine language. More recently, further advances in programming languages have paved the way for quicker, more result-oriented programming techniques. However, an evolution in programming languages usually comes with a set of trade-offs. Advances in programming languages usually shorten the development cycle, but add processing and storage overhead to the program. Language developers strive to balance these trade-offs.

Many programming language trade-offs are reflected in how a compiler compiles source code. Generally speaking, a compiler is a piece of software that converts a program from a source programming language (which is readable, more easily understandable by humans) to machine language (sometimes called binary or object code, which the computer executes). The compiler analyzes the source code and, to produce more efficient code, performs program transformations, such as branch elimination, partial evaluation, or peephole optimization, on the code. For example, a computer programmer often writes source code that sets forth a logical flow of operations that is simple and intuitive for a human to follow, but is inefficient for a computer to execute. The compiler recognizes inefficiencies and improves the performance of the software at the machine code level by eliminating operations that are unnecessary to achieve the intended results. In this way, the programmer creates a robust software program that is useful and efficient in a reasonable period of time.

I. Object-oriented Programming

Object-oriented programming ("OOP") over the last few years has become common for software development in many areas. OOP is often done in a programming language such as Java, C++, Python, or C#. Numerous models for OOP have been developed, and terminology varies from model to model.

In one abstract model, OOP is a software design method that models the characteristics of abstract or real objects using "classes" and "objects." A class defines a template or prototype for an object. The structure and behavior of a class is determined by class variables (sometimes called properties or attributes) and methods (one term for software routines). An object is an instance of a class. An object is created when a variable of a class type is declared in a program. The object is produced by allocating a data structure that includes or references the variables and methods defined by the class template and by initializing the variables with either default values or those provided by a class constructor method.

Access to the data of an object is defined through methods which hide the internal workings of the object. This allows a programmer to develop a well-defined set of methods to manipulate variables and data. This also facilitates robust and secure programming because variable and data manipulation happen through the methods of an interface or an object's own internal methods.

II. Recursion

Recursion is a programming technique in which a software routine calls itself. When a method, function, or other routine calls itself, it is termed a recursive call. Recursion provides an intuitive way to model and solve many software problems, but can result in inefficiencies during execution. The classic example of recursive routine is a function for calculating factorials. A simple recursive function to calculate the factorial of a number is as follows:

```
int factorial(int n) {
    if n = 0
        return 1;
    else
        return n * factorial (n-1);
}
```

Code Fragment 1

Usually, a recursive routine performs a test on its arguments to check for a "base case," which is a condition under which the routine returns a value without calling itself, thus terminating the chain of recursive calls. In the factorial example, the function factorial checks to see if the base case (i.e., the number n being equal to zero) has been reached. If the base case has not been reached, the function calls itself, subtracting one from n to pass as the parameter. This process is repeated until the base case is reached. Then, the value 1 is returned to the preceding function call, which multiplies the returned value (1) by the value of n at that level in the recursive chain, then returns that product to the preceding function call, etc. This backing out process continues until the factorial function has exited all the preceding function calls, ultimately returning the result n*(n−1)*(n−2) . . . * 1 to the original caller.

During a recursive call, a complete new copy of the function's "information" (such as parameters, return addresses, etc.) is placed into memory, for example, as a stack frame on a stack for function calls. When a particular function call returns or exits, information for that function call is freed, effectively removing it from memory. Many levels of function calls can be initiated when performing recursion, resulting in numerous copies of information for the function call actively residing in memory. The function call factorial(100) results in 101 recursive function calls, for example. The function factorial is simple, but more complex functions include more operations in the body of the function call and result in an increased use of processing resources. Recursive routines, especially complex or lengthy ones, use a lot of computing resources compared to alternative, non-recursive implementations. However, recursive code will often be more compact, easier to design, develop, implement, integrate, test, and debug. This is especially true for recursive code for traversing complex data structures such as different types of tree data structures.

A variation on recursive calls is called tail-recursion. A call is tail-recursive if nothing has to be done in the function (except return) after the recursive call returns. A simple tail recursive function is as follows:

```
int tail_fac(int n, int m) {
    if n = 0
        return m;
    else
        return tail_fac(n-1, n*m);
}
```

Code Fragment 2

The function in code fragment 2 is a tail-call recursive function because the last call made in the function is to itself, and when the call returns no other processing occurs. On the other hand, the function in code fragment 1 is not a tail-recursive function because it requires additional processing after a recursive call returns. Namely, when a recursive call returns, the returned value still needs to be multiplied by the value of n.

Tail-call recursive functions provide an opportunity for optimizing recursive functions; for example, when using tail-calls, it is not necessary to retain stack frames for the chained calls as the calling environment. This means that the function uses a constant amount of memory; only one copy of the function's information is ever residing in memory at one time. A simple way of translating the function of code fragment 2 for tail-call optimization (by a compiler or other tool) is as follows:

```
int tail_fac(int n, int m) {
    start: if n = 0
        return m;
    else {
        m = n*m;
        n = n-1;
        goto start;
    }
}
```

Code Fragment 3

Code fragment 3 illustrates an optimized version of the tail_fac function; it returns the same result as code fragment 2. However, in this example, the recursive call has been removed and a "goto" label has been added instead. The comparison (n=0) and goto statement essentially tell the function to keep looping until n is 0. Only one copy of the function is necessary at any one time because with each loop through the function the values are updated and carried forward to the next loop of the function.

In the following sections, the examples are somewhat simplified for the sake of illustration. Many of the recursive code fragments presented could be written in a non-recursive fashion. But the same principles apply in other scenarios where writing non-recursive code is either very difficult or just not possible. For example, writing code that will perform a depth-first traversal on a data structure such as a binary tree is easy to do using recursion, but is very difficult to do using non-recursive means. More generally, recursion often allows simple solutions to processing problems that involve complex, nested list structures. The problem might be solving a mathematical expression with an arbitrary number of nested sub-expressions (e.g., (w*(((x+3)*y)−z)), searching through a tree structure that explores the potential moves in a game, evaluating an arbitrarily complex statement following some grammar in a compiler, or some other problem requiring traversal of a complex, nested structure.

III. Iterators and Generators

Most programming languages, including database languages and document processing languages, support base types for collections of base elements (e.g., arrays of integers, strings of characters) as well as user-defined types for arbitrary collections of elements (e.g., enumerations of ordered elements) and more complex data structures such as trees, stacks, queues, and linked lists.

A software object for representing a collection of elements often provides methods for services such as insertion, deletion, searching, sorting, or testing an item for membership. Iterators encapsulate the logic for "walking over" or enumerating the elements of collections. An iterator accesses elements from a list, array, or other collection one at a time. By extension, an iterator can be used to access elements from another data structure (e.g., tree-shaped structure) that can be viewed as a list. In the programming language C#, for example, an iterator is a language construct that simplifies the process of iterating over the elements of a particular type of collection.

To illustrate, suppose a class wants to support iteration using the foreach loop construct of the C# language. The class must implement the "enumerator pattern." The programmer codes the following using a foreach loop construct:

```
List1 list1 = ...;
foreach(object obj in list1)
    { DoSomething(obj); }
```

Code Fragment 4

"List1" is a class for a collection of elements of type "object," and DoSomething( ) is a routine for doing something to the current object being iterated over in the List1 collection. The C# compiler expands that foreach code into the following code that uses a while loop construct.

```
Enumerator e = list1.GetEnumerator( );
while(e.MoveNext( ))
{
    object obj = e.Current;
    DoSomething(obj);
}
```

Code Fragment 5

The List1 data structure on whose instance the iteration occurs must support the GetEnumerator function (as well as the MoveNext method and Current property, described below) in order for the foreach loop to work. The creator of the List1 data structure implements the GetEnumerator function, which returns a ListEnumerator object:

```
public class List1
{   internal object[ ] elements;
    internal int count;
    public ListEnumerator GetEnumerator( )
        { return new ListEnumerator(this); }
}
```

Code Fragment 6

The ListEnumerator object also implements the Current property (which indicates the current object in the List1) and the MoveNext method (for moving to the next object in the List1, if there is one.). The object maintains its internal state to allow moving to the next item each time around the loop. This internal state machine may be simple for the List1 data structure, but for data structures that require recursive traversal, such as binary trees, the state machine can be quite complicated.

Because implementing this enumerator pattern can require a great deal of effort and code on the developer's part, C# includes support that makes it easier for a class to dictate how the foreach loop will iterate over its contents. An iterator is the logical counterpart of the foreach loop construct. In C#, iterators are methods that incrementally compute and yield a sequence of values. Iterators make it easy for a type to specify how the foreach statement will iterate over its elements. An iterator is defined using the GetEnumerator function, returning an IEnumerator<T>. (In previous draft versions of the C# specification an iterator was defined similarly to a function in class implementation code, but using the foreach keyword, followed by an open and closed parenthesis pair.) For example, in the code fragment below, an iterator is declared for the List2 type. Notably, the return type of the iterator is determined by the user, and since the List2 class stores an "object" type internally, the return type of the iterator example below will be an IEnumerator<object>:

```
public class List2: IEnumerable<object>
{      internal object[ ] elements;
       internal int count;
       public IEnumerator<object> GetEnumerator( ) { }
}
```

Code Fragment 7

Iterators have or imply built-in state machines. When implementing the enumerator pattern, an internal state machine keeps track of the iterator's position in the data structure. The yield return keyword returns values back to the foreach statement that called the iterator. (In previous versions of the C# specification, the keyword "yield" was simply used; a "yield return statement" is sometimes more generally referred to herein as a "yield statement.") The next time the foreach statement loops and calls the iterator again, the iterator will begin its execution where the previous yield statement left off. In the simple example below, three string types are yielded.

```
public class List3: IEnumerable<string>
{      internal string[ ] elements;
       internal int count;
       public IEnumerator<string> GetEnumerator( )
       {    yield return "Microsoft ";
            yield return "Corporation ";
            yield return "Research";
            yield return "Web Data";
       }
}
```

Code Fragment 8

In the preceding code defining an implementation of List3, the GetEnumerator function indicates the iterator for the List3 type. The foreach loop (ultimately converted to a while loop calling the MoveNext method of the Enumerator object for list3) that calls this iterator will execute four times, each time receiving a string in the order specified by the four yield statements in the List3 type code, e.g., the following foreach( ) construct outputs "Microsoft Corporation Research Web Data" on the console.

```
List3 list3 = new List3( );
foreach(string s in list3)
    { Console.Write(s); }
Console.Writeline( );
```

Code Fragment 9

To return to the earlier List2 example, to implement an iterator to traverse the elements in a List2 of "objects", the iterator may be modified to step across the array of elements, yielding each item in the array in every iteration:

```
public class List2:IEnumerable<object>
{      internal object[ ] elements;
       internal int count;
       public IEnumerator<object> GetEnumerator( )
       {    foreach(object o in elements)
                { yield return o; }
       }
}
```

Code Fragment 10

Iterators in C# handle the potentially messy chore of implementing the enumerator pattern in classes that implement the IEnumerable and IEnumerator interfaces. Rather than the programmer having to create the classes and build the state machine, the C# compiler will translate the "iterator" code into the appropriate classes and code that uses the enumerator pattern. In so doing, iterators provide a significant increase in developer productivity.

Iterators are also very useful in situations where the amount of data is not easily known at the start of the process, or where the data is coming from an outside, possibly asynchronous source. In this situation again, the use of an iterator can simplify programming, as the bulk of the complex logic for accessing the data is in the iterator.

Iterators in C# are examples of more general software constructs called "generators." A generator is a construct that generates a stream of elements, where a "stream" is a variable-length sequence of elements. The elements can be base types such as integers or characters, or more complex types. In the examples given above, the foreach construct loops result in streams of elements being generated.

IV. Quadratic Effect in Nested Streams

The term "nested stream" describes a stream within another stream. For example, if a function that returns a stream repeatedly calls itself, the result of that recursive function (in a logical sense) will be streams of data within other streams. The problem with nested streams is that typically the streams have to be simplified or "flattened" into one stream before the data can be returned to the original caller. One reason for flattening may be simplification of results in the nested stream. Another reason may be type consistency—where data has to be flattened along the way because incompatible types may result otherwise (e.g., if a function is of a type "stream of integers," recursive calls to that function will return "a stream of a stream of integers," etc., a type that is incompatible with the original type "stream of integer"). So before the data can be returned and resolved, the streams need to be flattened. As with other recursive functions, the deeper and more complex the nesting of streams becomes, the poorer the performance.

The examples of iterators given above were not recursive. Iterators are typically associated with non-recursive functions because iterators perform poorly on recursive functions. Consider the following pseudocode example for the function FromTo.

```
int* FromTo(int n, int m){
    if(n<= m) {
        yield n;
        foreach(int i in FromTo(n + 1, m)) {
            yield i; }
    }
}
```

Code Fragment 11

In this code fragment, int* means "stream of integers." The function FromTo returns a stream of integers to a caller. (Note that the type of the FromTo function is int*, which allows the function itself to be used as the collection iterated across in the foreach loop.) Other languages use other symbols or conventions to indicate a stream return type or other collection of elements. (For example, C# uses the term IEnumerable<int> to indicate a stream of integers as an object implementing the IEnumerable interface. And, in C#, the C# compiler would attempt to convert corresponding FromTo code into code for a class implementing IEnumerable/IEnumerator interfaces, as mentioned above.)

Suppose the function FromTo is initially called as follows.

```
foreach(int j in FromTo(0,10){
    Console.WriteLine(j); }
```

Code Fragment 12

The function FromTo is called to determine the collection to be iterated over in the foreach loop. (In C#, this foreach code would be converted by the C# compiler into a while loop calling a MoveNext method of a newly instantiated enumerator object for the collection, as discussed above with respect to Code fragments 4 and 5). FromTo is passed the values 0 and 10 for n and m, respectively, and FromTo(0,10) returns a stream of 11 integers (0, 1, 2, 3, 4, 5, 6, 7, 8, 9, 10). The foreach loop iterates through the returned stream of integers and outputs each integer in the stream.

Stepping into and through the FromTo function of code fragment 11 illustrates the recursive process. Within FromTo, an initial comparison determines if n is less than or equal to m. To start, n (0) is less than m (10), which means that the computer executes the "yield n" statement. The yield statement produces the value "0." FIG. 1 shows the values produced by the yield statements through the entire call to FromTo(0,10). The value 0 at the left of the top row is the value produced by "yield n" in the n=0 level.

FromTo continues execution. The next statement to be executed is the foreach statement, which recursively calls FromTo(n+1,m). At the next level, n is 1, and FromTo yields a 1 value and then recursively calls FromTo(n+1, m). Thus, at each level, the function FromTo yields the value n (shown as the far left of the respective rows in FIG. 1), then recursively goes to the next level. This continues until FromTo(11,10) is called, at which point the comparison (n<=m) is false and FromTo returns an empty stream of integers to the previous recursive caller (at level n=10). The foreach loop at that level exits (having nothing to iterate over in the returned empty set) and FromTo returns a stream of one integer (10) to the recursive caller (at level n=9). It is at this point that the real problem of the quadratic effect is manifest. Each recursive level yields not only the current value of n, but all higher values of n as well (through the loop of yield return i statements). So, the foreach loop in FromTo at the level where n=9 still has one element (i.e., 10) to iterate over, which means the yield return i statement is executed for i=10 (shown as the far right of the second row from the bottom).

FIG. 1 shows another representation of the total number of yields required to output the stream (0, 1, 2, 3, 4, 5, 6, 7, 8, 9, 10). Another way of representing this data is to show the nested streams: (0, (1, (2, (3, (4, (5, (6, (7, (8, (9, (10, ( )))))))))))).

Returning to the process, the foreach loop continues executing the yield i statement for values returned from the lower level, until the FromTo loop returns from the level n=0 with the stream (0, 1, 2, 3, 4, 5, 6, 7, 8, 9, 10), which is iterated over by the caller in code fragment 12 and output by the Console.WriteLine statement. The yields at the level where n=0 are shown in the top row of FIG. 1. The remaining yields are side effects of the recursion, and can affect performance significantly.

The evaluation of FromTo(0,10) results in an explicit flattening of the nested streams of integers into a single, simple stream. In the course of processing, however, the recursive calls of FromTo result in an inefficient number of yield operations. Even though the goal of FromTo was to return a stream of x integers (here, x=11), the processing resulted in $$\frac{x(x+1)}{2}$$

yields (here, 66). This is an example of a quadratic relation, where the complexity of processing x elements can be characterized as $O(x^2)$. The disparity between linear and quadratic complexity becomes more pronounced for higher values of x, for example, for x=1000 integers, processing would result in more than half a million yields.

A similar situation happens in languages with simple generators such as Python or C# when programmers manually flatten the results of recursive generators. For example, the following C# method will execute a quadratic number of yields due to the repeated explicit flattening of the recursively generated streams.

```
IEnumerable<int> Down(int n) {
    if(n>0)
    {
        foreach(int i in Down(n-1)) {
            yield return i;
        }
    }
    yield return n;
}
```

Code Fragment 13

In many document oriented languages, such as XQuery, XPath, XDuce, XTatic, CDuce, and X#, the notion of automatically flattening nested streams and removal of embedded empty streams is supported. For example, in XQuery the sequence ((((( ),1),2),3),4),5) is naively flattened into the single sequence (1, 2, 3, 4, 5), where ( ) is an empty stream. Essentially, the sequence ((((( ),1),2),3),4),5) is the sequence ((((( ),1),2),3),4) (which in turn must be flattened) and 5. Even in these languages, the naive flattening of nested streams can result in quadratic time complexity due to repeated implicit flattening of inner streams.

As a result of these limitations, sequences in XQuery, streams in X#, and iterators in C# and Python, to name a few generators, are limited to simple, non-recursive generators for effective usage. Iterators in C#, however, are a very useful construct for which effective operation in conjunction with recursion would be advantageous. XQuery and XPath are important languages for the World Wide Web which contain many implicitly recursive path queries (descendant queries) whose performance is sub-optimal if naive flattening strategies are used. In particular, there is a need in these and other contexts for a mechanism to flatten nested streams quickly and effectively.

SUMMARY

Techniques and tools are presented herein for fast flattening of nested streams. In various common situations such as those involving recursive iterators, recursive path queries, or evaluation of nested sequences, these techniques and tools dramatically reduce the time to flatten nested streams. For example, the tools and techniques may reduce the complexity of recursive generators from quadratic complexity to linear complexity. The various techniques and tools can be used in combination or separately.

According to a first aspect, a tool traverses nested streams of elements using a stack to efficiently flatten the stream. For example, the tool pushes received nested streams onto the stack. Iterating through the active stream, the tool either produces an element from the active stream, pushes another nested stream onto the stack and continues, or pops the active stream from the stack and continues. This technique may reduce the time it takes to process recursive generators and improves the mechanism for flattening nested streams.

According to a second aspect, a tool executes code for a stream generator, which may alternatively return a value of two different types. For example, in the context of source code for the stream generator, a recursive generator may return a value of a type or a stream of values of the type. Thus, nested streams may be recursively generated without causing type-compatibility problems According to a third aspect, a tool for a software language includes a module for performing type checking. For purposes of stream generating code, the module treats a stream of a type as being equivalent to a stream of the stream of the type. In this way, for example, a compiler provides code that will efficiently execute for stream generators such as recursive iterators.

Additional features and advantages of the invention will be made apparent from the following detailed description of embodiments that proceeds with reference to the accompanying drawings.

BRIEF DESCRIPTION OF THE DRAWINGS

FIG. 1 is a chart showing the quadratic number of yields produced from naively flattening nested streams in a recursive iterator according to the prior art.

FIG. 4 is a chart showing the linear number of yields produced from flattening nested streams in a recursive iterator according to the technique shown in FIG. 3.

FIGS. 6A-6C are listings of code in C# for traversing a binary tree data structure.

DETAILED DESCRIPTION

The following description is directed to techniques and tools for fast flattening of nested streams. In various common situations such as those involving recursive iterators, recursive path queries, or evaluation of nested sequences, these techniques and tools dramatically reduce the time to flatten nested streams. In some contexts, the improvement is from quadratic time complexity to linear time complexity.

The techniques and tools for flattening nested streams are described below in the context of flattening nested sequences to simplify and remove empty streams, flattening the processing and results of recursive iterators, and managing traversal of a binary tree data structure. Alternatively, the techniques and tools are applied in various other situations. For example, the techniques and tools are applied in other situations in which a data structure such as an arbitrary tree data structure, stack, queue, or linked list of elements is processed as nested streams of elements. Or, the techniques and tools are applied in various database processing contexts to process database elements organized as nested streams of elements. Or, the techniques and tools are applied in various document processing contexts to process hierarchical document elements organized as nested streams of elements Conceptually, these techniques and tools improve software performance by formalizing the notion of yielding every element in a stream at most once. The various embodiments of the techniques and tools use different implementations to achieve such results.

I. Techniques for Flattening Nested Streams

Figure 2:
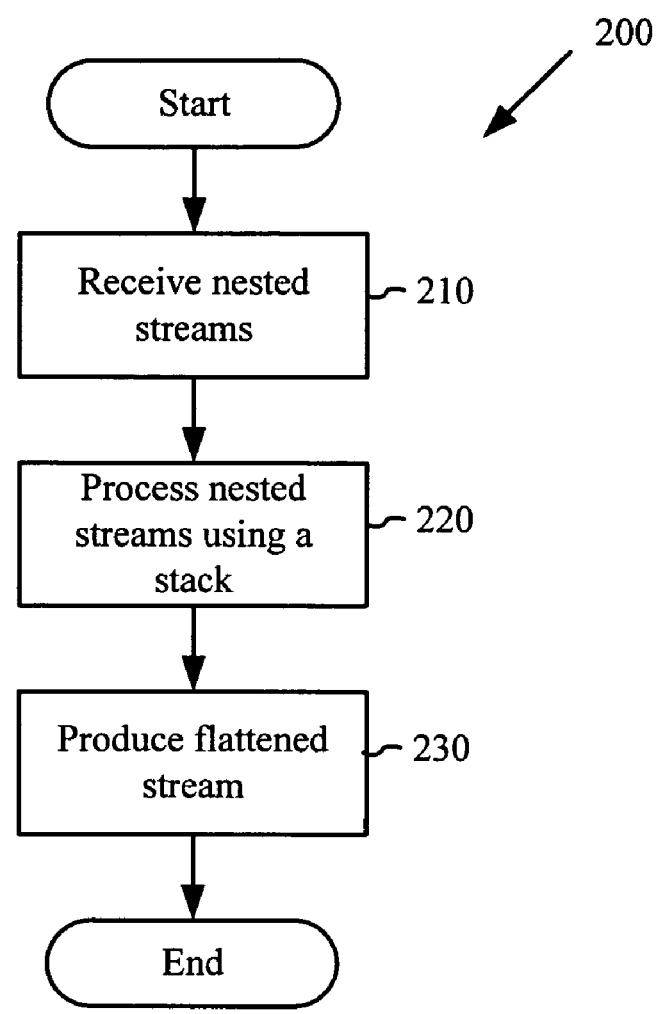
FIG. 2 is a flowchart illustrating a generalized technique for flattening nested streams.

FIG. 2 illustrates a generalized technique (200) for flattening nested streams. A software tool such as an iterator or other generator, query engine, or tree traversal tool performs the technique (200) for flattening nested streams. Alternatively, another tool performs the technique (200).

Initially, the tool receives (200) nested streams to be flattened. For example, the nested streams are streams modeling a recursive iterator, a recursive path query, or recursive traversal of a tree. Alternatively, the nested streams are for elements in some other context.

Next, the tool processes (220) the nested streams using a stack. Maintaining a stack could involve a wide range of solutions, because the actual implementation of the stack can vary. In C++ or Java a stack can be represented by an array, a linked list of objects, or potentially some other structure. Database languages (e.g. SQL,) also model collections of elements, and document processing languages (e.g., XQuery, XPath, XDuce, XTatic, CDuce, and X#) organize hierarchical collections of elements in documents.

In some implementations, the tool processes the nested streams as described below with reference to FIG. 3. Alternatively, the tool processes the nested streams using some other mechanism. Finally, the tool produces (230) a flattened stream.

A. Processing Nested Streams Using a Stack

Figure 3:
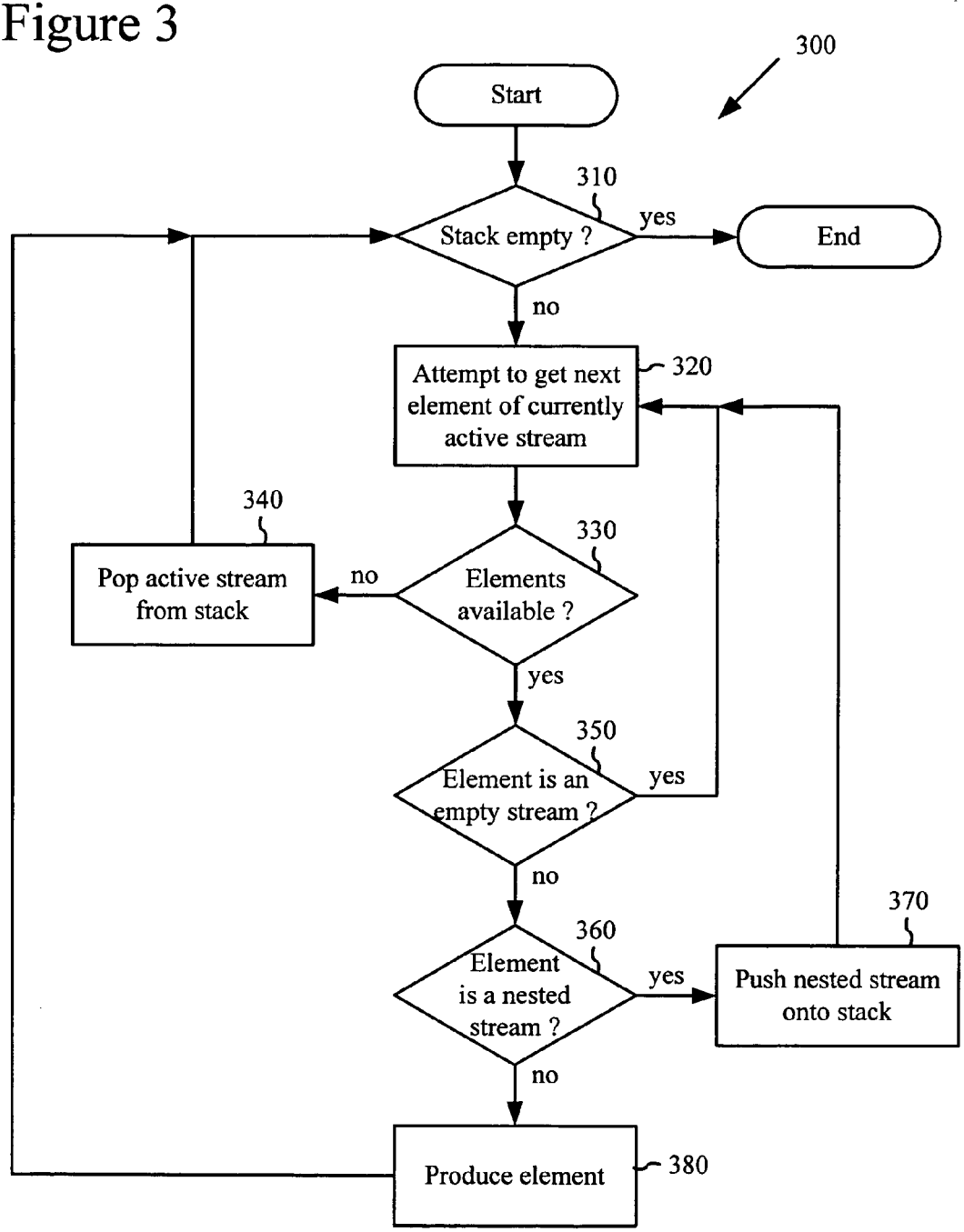
FIG. 3 is a flowchart illustrating a technique for processing nested streams using a stack.

FIG. 3 illustrates a technique (300) for processing nested streams using a stack. A tool such as one listed above performs the technique (300). Alternatively, another tool performs the technique (300). FIG. 3 provides one ordering for the various stages of the technique (300), which are described in detail below. Alternative implementations may separate further, combine differently, reorder, and/or use the stages of the technique in various combinations in conjunction with other stages.

Conceptually, in the technique (300), the nested stream flattening tool implements operational semantics that formalize the notion of yielding every element in a set of nested streams at most once. Each level in the stack includes a stream (more precisely, a pointer to the stream), where that stream can itself be a simple stream or nested stream. Thus, the tool at this stage treats a stream the same as a stream of streams or a stream of streams of streams, etc. The streams in the stack may be representations of simple lists of elements. Or, the streams in the stack may be representations of elements in other structures such as trees or even stacks, which may be handled as streams by the nested stream flattening tool.

The technique (300) begins with a stream representing the entire set of nested streams on the stack. To start, the tool checks (310) whether the stack is empty. If the stack is empty, the technique (300) ends. Otherwise, the technique continues processing. For example, suppose a stream for the sequence ((((( ),1),2),3),4),5), which was the XQuery sequence discussed in the Background, is on the stack for processing.

If the stack is not empty, the tool attempts (320) to get the next element of the currently active stream. The first element of the stream ((((( ),1),2),3),4),5) is the nested stream ((((( ),1),2),3),4). The tool evaluates the result of attempting (320) to get the next element by checking it against various possibilities.

The tool checks (330) if there are any more elements available in the currently active stream. If the result indicates at least one element of some kind is still to be processed in the active stream, the tool checks those other possibilities, as discussed below. If there are no more elements in the currently active stream, the tool pops (340) the active stream from the stack and continues by checking (310) whether the stack is now empty. As used herein, the phrases "pop" and "push" a stream are meant to include operations in which pointers or other references to streams are popped or pushed from the stack structure. In other implementations, popping and pushing may involve more than just the pointers, for example, individual streams may be pushed on the stack.

When there is an element of some kind remaining in the active stream, the tool checks (350) whether the element is an empty stream. If it is, the tool attempts (320) to get the next element in the active stream.

Otherwise, the tool checks (360) whether the element is itself a nested stream. If so, the tool (370) pushes the nested stream on the stack, making the nested stream the currently active stream. Then the tool attempts (320) to get the next element in that stream. As noted above, the first element of the stream ((((( ),1),2),3),4),5) is the nested stream ((((( ),1),2), 3),4). So, the tool pushes the stream ((((( ),1),2),3),4) onto the stack to become the active stream. Subsequently, the tool pushes the nested streams ((((( ),1),2),3), ((( ), 1),2), and (( ), 1) onto the stack before reaching the empty stream ( ).

Notably, if the next element does not fall under any of the previously described categories, the next element is a basic element, and the tool produces (380) the element. For example, when the active stream is (( ), 1), the empty stream is skipped (350) and the next element 1 is produced by the tool. The tool then checks (310) if the stack is empty. At this point, the tool reaches the end of the active stream (( ), 1), which means there are no more elements available in the stream, so the tool pops (340) it. The tool proceeds to the next stream and produces the next element—2—in the active stream ((( ), 1),2), then reaches the end of that stream and pops (340) it. This continues until the tool produces the last element—5—of the stream ((((( ),1),2),3),4),5), pops (340) that stream, and determines (310) that the stack is now empty.

B. Handling Recursive Iterators

Another example described in the Background involved the recursive iterator in the FromTo function in pseudocode fragments 11 and 12. A stream flattening tool may apply the technique (300) of FIG. 3 to process the recursive FromTo calls as a set of nested streams. As noted above, the function FromTo returns a stream of integers, so "stream of integers" is the type of the function. The compiler is modified in various ways to recognize and process recursive iterators and generate code for efficiently flattening streams. In one implementation, the programmer changes the FromTo function code to indicate a recursive iterator. In alternative implementations, the compiler recognizes a recursive iterator without requiring a programmer to make changes to its function code.

Compilers use a predetermined set of rules when converting source code to machine language. In some implementations, compilers have new rules so that the techniques described in conjunction with FIG. 3 are implemented. For example, one of many ways an iterator may be modified to notify a compiler of a recursive iterator includes a programmer modifying the recursive iterator code in fragment 11 as follows:

```
int* FromTo(int n, int m){
    if(n<= m) {
        yield n;
        yield FromTo(n + 1, m);
    }
}
```

Code Fragment 14

Like the code in code fragment 11, this pseudocode returns the stream of integers (0, 1, 2, 3, 4, 5, 6, 7, 8, 9, 10) and uses a recursive call to FromTo(n+1, m). Unlike the code in code fragment 11, however, the recursive call to FromTo(n+1, m) is part of a yield statement. The compiler is modified to allow stream types to be part of yield statements. Other modifications to the compiler are described below. Here, the recursive call "yield FromTo" alerts the compiler to the fact that the iterator is recursive and the resulting stream is processed accordingly.

FIG. 4 shows the yields produced during processing of a call to FromTo(0, 10) according to the technique (300) shown in FIG. 3. Initially, a stream representing FromTo(0, 10) is on the stack. This stream can be represented as (0, FromTo(1, 10)), where FromTo(1, 10) can be represented as (1, FromTo (2, 10)), etc. The tool gets (320) and produces (380) the first element in the stream for FromTo(0, 10), which is the value 0 shown at the top row of FIG. 4. The tool then gets (320) the next element (the stream for FromTo(1,10) and pushes (370) that stream onto the stack, where it is the currently active stream. Continuing the example, the tool gets (320) the next element, which is the value 1, and produces (370) it. The tool then gets (320) the stream for FromTo(2, 10) and pushes (370) that stream onto the stack. This continues until the tool has produced (370) the value 0 and determines (350) that the next element FromTo(11, 10) is an empty stream. The tool then pops (340) the various streams off the stack and ends. Unlike FIG. 1, the number of yields is related to n in a linear fashion. There are roughly 2× (i.e., O(x)) yields, rather than $$\frac{x(x+1)}{2}$$

yields, and a significant yield occurs at the various different levels of the recursion.

Different implementations use any of various different programming languages, programming language constructs, and compiler adjustments to handle nested streams in various contexts. The pseudocode example in fragment 14 is merely illustrative of one abstract language's modifications to control the quadratic effect. Languages may implement the technique (300) in a similar fashion or perhaps with vastly different mechanisms.

C. Handling Recursive Iterators in C#

One implementation of the techniques and tools described herein uses the C# programming language. C# allows a programmer to specify iterators in various ways. A programmer may specify an iterator using a few constructs, which a C# compiler uses to create classes and code implementing the IEnumerable and IEnumerator interfaces for an Enumerator object. In general, the C# compiler converts a foreach loop in a caller to an instantiation of an Enumerator object and a while loop. In the while loop, the MoveNext method of the Enumerator object is called and, for every Current object in the collection, the statement in the original foreach loop is executed.

In the class definition that includes the iterator, for example, the programmer includes a GetEnumerator( ) function that returns an IEnumerator<T> and includes yield statements to define an iterator in C#. The C# compiler creates for the programmer an object that implements the iterator using the IEnumerable and IEnumerator interfaces. Moveover, the C# compiler generates code for returning an Enumerator object and generates code for the MoveNext method and Current property of the Enumerator object. The MoveNext method code, in particular, operates as a state machine that maintains a stack of streams.

Figure 5:
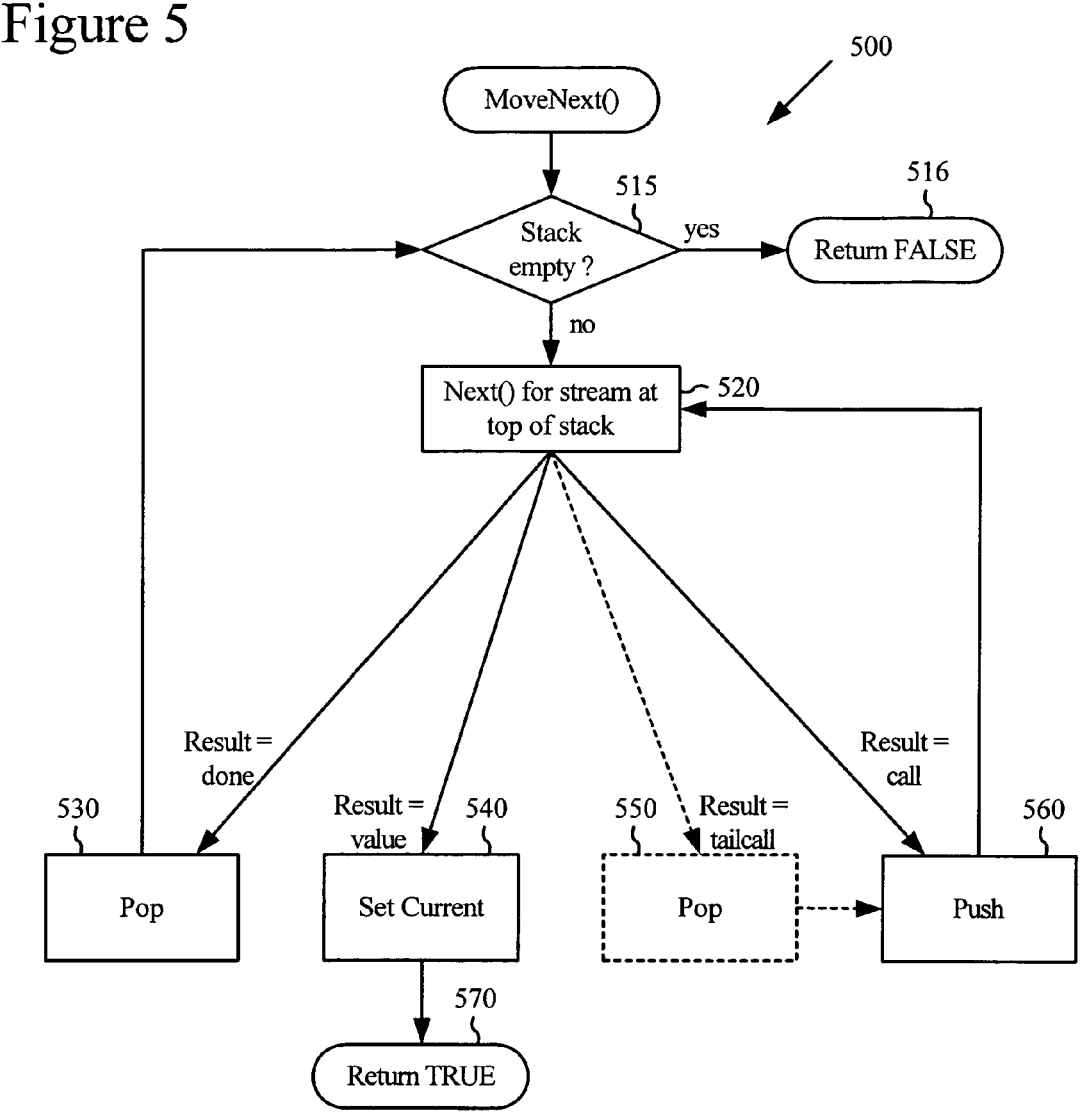
FIG. 5 is a state machine representing processing for the MoveNext( ) method of an Enumerator class for an iterator in C#.

FIG. 5 shows a state machine (500) representing processing for the MoveNext( ) method of an Enumerator class for an iterator in C#. A stream flattening tool such as one listed above includes an Enumerator object that operates as shown in the state machine (500). Alternatively, another tool includes the state machine (500).

As noted above, the MoveNext( ) method is called in the condition part of a while loop for a caller foreach construct. The MoveNext( ) method returns TRUE or FALSE, where TRUE indicates there was another element in the nested stream, and FALSE indicates there were no other elements in the nested stream. During MoveNext( ) processing, various side effects update the stack of streams and the Current element in the set of nested streams.

The tool initially checks (515) whether the stack is empty. For example, the enumerator object maintains a count variable indicating the number of streams pushed on the stack, and if count=0 then the stack is empty. If the stack is empty, the MoveNext( ) routine returns (516) the value FALSE.

Otherwise, the tool calls (520) the Next( ) method of the stream currently at the top of the stack. The Next( ) method returns a result that depends on the type of stream elements in the nested streams. In the state machine (500) shown in FIG. 5, the result of the call is: (1) some indication that the currently active stream is done (no more elements), (2) some indication that the next element is a call to another stream (a nested stream), (3) a value (a basic element), or (4) some indication that the next element is a tail-call to another stream, e.g., a nested stream at the end of the currently active stream. Other types of stream elements may have different implementations for the Next( ) method. When a programmer introduces a new data type or structure, the programmer may provide an implementation for the Next( ) method to indicate how that type or structure should be handled in nested streams. Moreover, new rules may be added to the compiler to handle the new data type or structure.

Referring back to FIG. 5, if the result of the call to Next( ) indicates that the currently active stream is empty, the tool pops(530) the stream from the stack and checks (515) whether the stack is empty.

If the result of the call to Next( ) indicates that the next element is itself a stream, the tool pushes (560) the nested stream onto the stack. The tool then evaluates the elements in the pushed stream by calling (520) the Next( ) method of that stream.

If the result of the call to Next( ) indicates that the next element is a value for a basic element, the tool sets (540) the Current property of the enumerator object. The Current property is accessed from the while loop for the calling foreach loop construct; it indicates the element currently being iterated over in a collection Continuing the example, the tool then returns (570) the value TRUE for the MoveNext( ) method.

Finally, the state machine (500) may include an additional optimization for handling tail-calls. In the context of nested stream processing, a tail-call indicates a nested stream that is itself the last element, or tail stream, of a stream. If the result of the call to Next( ) indicates that the next element is itself a stream that is the last element in a stream, the tool pops (550) the current stream from the stack and pushes (560) the nested stream onto the stack. Alternatively, the tool handles tail-calls by just pushing the nested stream and popping the respective streams when they are later determined to be empty.

Tail calls often provide opportunities for optimization. Generally, stack space is allocated each time something is pushed on a stack. When that thing is popped from the stack, the stack space is deallocated. Notably, if the last element of a given stream at the top of the stack is itself a nested stream, the simple way to process that nested stream is to push it to the top of the stack. The stream right below the top (i.e., the "parent" stream) has no elements left, however, and is just taking up stack space. While this may not seem like very much space, nevertheless, on a large nested stream where performance is critical, it adds up. Yet stack growth can be limited dramatically in certain circumstances. For example, consider the nested stream (0, (1, (2, (3, (4, (5, (6, (7, (8, (9, (10, ( )))))))))))). In this case, processing a tail stream in the current stream as a tail call prevents the stack from growing over one deep because, just before each stack push of the tail stream, the current, parent stream is popped.

D. Traversing a Binary Tree

FIGS. 6A through 6C show C# code for traversing a binary tree data structure. In the code, a binary tree of arbitrary depth and complexity is treated as a set of nested streams. The set of nested streams is processed using a stack to flatten the set of nested streams into a list of constituent values of the binary tree. The flattening returns a result of processing the nested streams but does not itself affect the contents of the nested streams or the underlying binary tree. Although the example in FIG. 6A through 6C shows C# code, other languages could instead be used.

FIG. 6A shows C# code for a definition of the class Tree. The C# code in FIG. 6A is coded by a programmer, perhaps with the assistance of developer tools. The Tree class includes three properties l, r, and v for a given node of a binary tree. The l and r properties are the left and right sub-trees, and are themselves of the Tree class. The v property is the integer value of a given node.

Figure 6D:
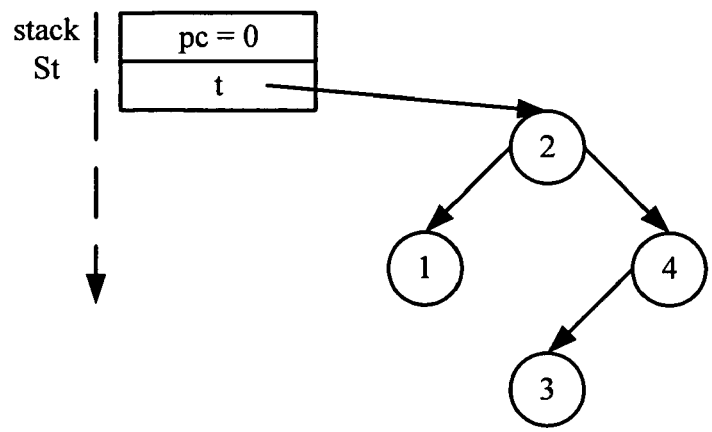
FIGS. 6D-6G are charts illustrating a stack at various stages of traversing the binary tree.

The Tree class also includes a constructor Tree(Tree l, int v, Tree r) for instantiating a tree node and setting its values. The code at the bottom of FIG. 6A shows a series of Tree instantiations that create the binary tree shown in FIG. 6D. The statements first create a Tree t1 with the value 1 and no sub-trees, then create Tree t3 (having the value 3) and link it as the left sub-tree of the Tree t4 (having the value 4). Finally, the Tree t2 is created with t1 as the left sub-tree, the value 2, and t4 as the right sub-tree. The entire tree t2 can be viewed as a nested stream:

(t1, 2, t4)=((null, 1, null), 2, (t3, 4, null))=((null, 1, null), 2, ((null, 3, null)), 4, null))

Referring again to FIG. 6A, the Tree class includes a recursive function YieldTrav(Tree t) designed to perform an in-order recursive traversal of a tree t and return a stream of integers (int*) for the values of the nodes in the tree. An in-order traversal recursively visits each node in a binary tree, by visiting the left sub-tree of node, then the node value, then the right sub-tree of the node, starting at the root node. For example, YieldTrav(t2) should return an integer stream with the values 1, 2, 3, 4. The C# compiler generates class and method code for performing this traversal, as explained below with reference to FIG. 6B. A given call to YieldTrav( ) may be converted to code for iterating through an enumerator object, as explained below with reference to FIG. 6C.

FIG. 6A shows code for a method LazyTrav( ) that returns an interface of type IEnumerable. An interface IStream is declared and a class LazyTrav (inheriting from IStream) is defined in the code of FIG. 6A. The LazyTrav class includes the properties pc (which acts as a counter for the Next( ) method of a stream) and t (which is a Tree associated with the stream). A constructor for the LazyTrav class accepts a Tree and sets the t property of the LazyTrav object to it.

Finally, FIG. 6A shows code for the method Next( ). The method Next( ) returns an object for the next element in the stream associated with a given Tree node. The object may be a left or right sub-tree (itself handled as a stream), an integer value, or a null value (for the end of the stream associated with the Tree node.) The counter pc starts at 0 and is incremented after being evaluated in the switch statement, thus tracking progress through the stream associated with the Tree node. For different types of streams, the Next( ) method may provide different code that indicates how to determine the next element in those types of streams. The Next( ) method's switch statement and the MoveNext( ) method provide a way to implement iterators for the "yield return" construct in C#—to perform the stopping, producing, and resuming on cue. Alternatively, some other mechanism is used to perform the stopping, producing, and resuming for a generator.

FIG. 6B shows code for the class Enumer, which inherits from the IEnumerable and IEnumerator interfaces, and which the compiler creates to wrap the iterator specified in the YieldTrav( ) method. It is difficult to write a generator that implements the IEnumerable (or the underlying IEnumerator) interface. In order to implement the IEnumerable interface on type "stream of T" (where T may be any type), for instance, a state-machine needs to be created that iterates over the individual T elements in the stream and exposes the current T value. In FIGS. 6A and 6B, the state-machine for iterating over a stream uses the MoveNext( ) method and it exposes the current object via the Current property.

The Enumer class includes a Stack object (initialized to be empty) and a "current" property of the general type object (also initialized null). When creating an enumerator object, the constructor for the Enumer class takes a stream object, creates a stack St, and pushes the stream object onto the stack.

The MoveNext( ) method of the Enumer class includes code for iterating through the elements in a set of nested streams. The method MoveNext( ) checks whether the stack St is empty (whether the count is 0) and, if so, returns FALSE.

If the stack St is not empty, the MoveNext( ) method calls the Next( ) method of the stream at the top of the stack. If the Next( ) method returns a stream, that stream is pushed on the stack and the MoveNext( ) method continues with that stream. If the next method returns null (because the end of the stream on top of the stack St has been reached or the stream is empty), the stream at the top of the stack is popped off of the stack St and the method MoveNext( ) continues (where it left off for the newly exposed top stream, or with an empty stack St). If the method Next( ) returns an integer, the method MoveNext updates the current property of the stack St and returns TRUE.

The code for the various stack processing methods (pop, push, peek, constructor) varies depending on implementation, and is not shown the figures.

Turning to FIG. 6C, FIG. 6C shows C# code for instantiating an enumerator object to enumerate the elements of the Tree t2 and code for prompting enumeration through the nodes of t2. The C# code may be written by a programmer or generated automatically by a C# compiler upon encountering a statement such as YieldTrav(t2). The first line shown in FIG. 6C takes some effort to trace:

IEnumerator ie=(IEnumerable)(t2.LazyTrav( )).GetEnumerator( );

Code Fragment 15

The Tree t2 has been created by the calls to the constructor for Tree in FIG. 6A, as described above. The call to the LazyTrav( ) method of the object t2 in turn causes the statement new LazyTrav(this) to execute, which is a call to the constructor for the LazyTrav class. That constructor sets the Tree t2 to be the property t in a stream object representing the Tree t2, and also initializes the property pc. Back in the LazyTrav( ) method for the Tree class, a call to the constructor of the Enumer class occurs, passing the stream object representing the Tree t2. The Enumer constructor creates an Enumer object with a stack St, and pushes the stream object for the Tree t2 on it. FIG. 6D shows this stack record as a stream having the properties pc and t, where pc is 0 and t is the tree t2.

The Enumer object is returned to the method LazyTrav( ) for the Tree class, which returns the Enumer object to complete the original call to t2.LazyTrav( ). The Enumer object is cast as an IEnumerable and the GetEnumerator( ) method of the object is called, which returns the object as an IEnumerator. Finally, the variable ie is set accordingly.

In the while loop in FIG. 6C, the MoveNext( ) method of ie is called.

```
while (ie.MoveNext( )){
    int i = int ie.current;
    ...;
}
```

Code Fragment 16

Essentially, this while loop performs a traversal of the tree t2 using an explicit stack of pending streams, where the top of the stack is the currently active stream and the lower stack frames maintain pointers and counters for previous, pushed streams that are still being evaluated. This mechanism flattens the nested streams representing the binary stream in linear time, by yielding each value in the nested streams at most once. (In contrast, flattening the nested streams with prior techniques could result in a quadratic number of yields.)

The MoveNext( ) method returns TRUE as long as there is another element in the Tree t2. The integer i is then set to the "current" property of ie, and is the latest value in the stream of integers. Various additional processing of the current node value i in t2 could be done (e.g., displaying on console, adding to a total), but is not shown. After the last element (4) in the Tree t2 has been reached, the method MoveNext( ) returns FALSE and the while loop exits.

In a bit more detail, the while loop first calls ie.MoveNext( ) when the stream for t2 is at the top of the stack and the counter pc is 0 for that stream. The stack count is 1, so the MoveNext( ) method calls the Next( ) method of the stream for t2.

```
object 1=((IStream) St.Peek( )).Next( );
```

Code Fragment 17

Figure 6E:
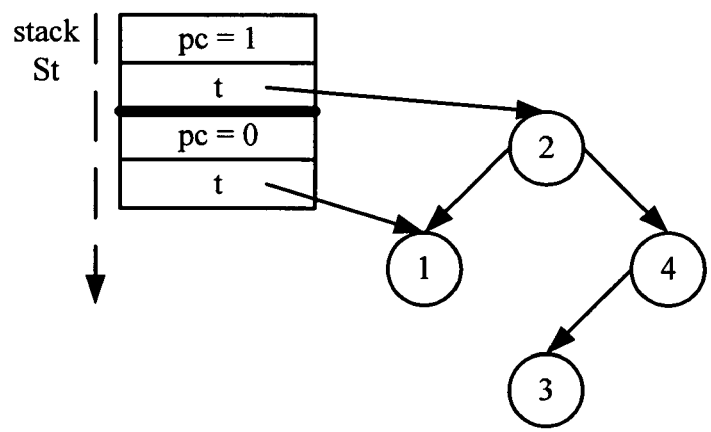

In the Next( ) method, the switch statement branches to case 0 (pc starts at 0). Since the left sub-tree of t2 is not null, a new stream object associated with the left sub-tree is instantiated. The new stream object includes a pc set to 0 and a Tree t for the Tree formerly known as t1. The new stream object is returned to MoveNext( ) and pushed on the stack St. FIG. 6E shows the stack at this point in processing. The variable pc has the value 1 in the stack frame for the stream for t2 since pc is incremented after evaluation in the switch statement.

The method MoveNext( ) continues and (since the stack is still not empty) calls the Next( ) method for the stream now on top of the stack, which is the stream for the left sub-tree of t2. The Next( ) method checks the case for pc=0, breaks, and then checks the case for pc=1. Since the current stream has a value, the value (1) for the node is returned. In MoveNext( ), the "current" property is updated to be the value and MoveNext( ) returns TRUE.

Figure 6F:
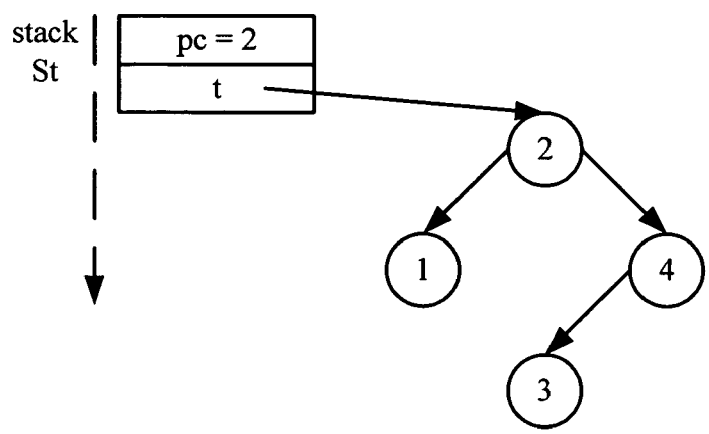

MoveNext( ) is called again from the while loop to evaluate whether its condition remains true. The Next( ) method for the stream for the left sub-tree of t2 is called again, which returns null. MoveNext( ) pops the current stream from the stack St, exposing the previous stream for t2, and continues. In the call to the Next( ) method of the stream for t2, pc=1 so the Next( ) method checks the node "value" case and returns the value 2, after again incrementing pc. MoveNext( ) updates the "current" property for the enumerator object and returns TRUE. FIG. 6F shows the stack at this point in processing.

Figure 6G:
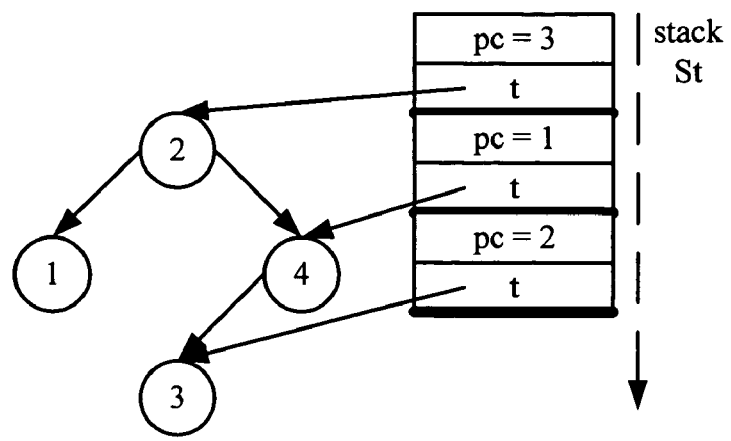

As the while loop continues, the right sub-tree of t2 is evaluated, and the current property of the enumerator object is set to 3. FIG. 6G shows the stack at this point in processing. The MoveNext( ) and Next( ) methods are not optimized for tail call processing, so the stack frame for the stream for t2 remains on the stack even though the end of that stream has been reached.

Eventually, the value 4 is also iterated over. In the next call to MoveNext( ), the stack frames for the right-sub-tree of t2 then t2 are popped from the stack St, and the method MoveNext( ) returns FALSE.

II. Compiler for Producing Nested Stream Flattening Tools

Figure 7:
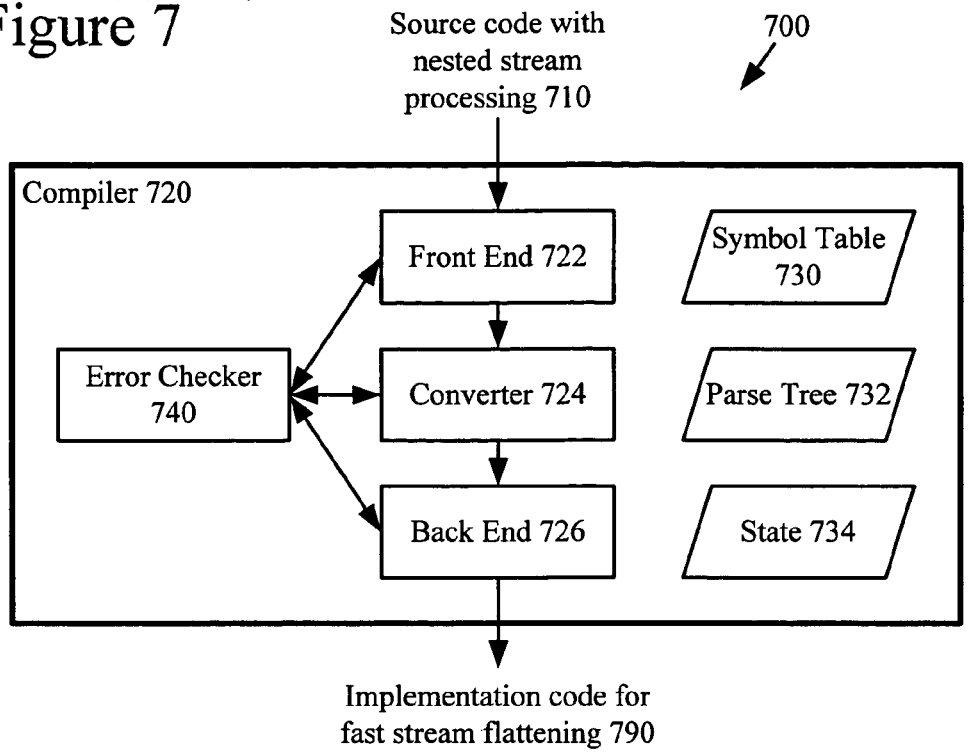
FIG. 7 is a block diagram of a compiler that generates implementation code for fast stream flattening.

FIG. 7 shows a block diagram of a compiler environment 700 used to generate implementation code for fast stream flattening from source code with nested stream processing. The nested stream processing may be, for example, for a recursive iterator in C# or other recursive generator, recursive path query processing in XQuery or another language, tree traversal, or other processing.

The compiler environment 700 includes a compiler 720 that accepts source code 710 with nested stream processing as input, and produces implementation code 790 as output. For a recursive iterator coded in C#, for example, the implementation code reduces the number of yields from quadratic complexity to linear complexity. In alternative embodiments, another type of programming environment is used to create implementation code for fast stream flattening.

The relationships shown between modules within the compiler environment 700 indicate the main flow of information; other relationships are not shown for the sake of simplicity. Depending on implementation, modules can be added, omitted, split into multiple modules, combined with other modules, and/or replaced with like modules. Alternatively, a tool with different modules and/or other configurations of modules generates code for a software tool that performs the interpreting and/or flattening techniques described herein.

Modules in the compiler environment 700 recognize constructs signifying recursive generators in the source code, or otherwise recognize opportunities for improving the performance of nested stream processing. The modules create code for efficiently flattening nested streams for a given data type or structure, and output the implementation code. The compiler environment 700 also provides error detection for the source code.

The compiler environment 700 includes a compiler 720 that accepts as input a file having source code 710 with nested stream processing, for example, a recursive iterator. The source code may include code for implementing a method to traverse a given type of stream such as a binary tree or other, arbitrary tree structure. The compiler 720 may process the code 710 in conjunction with one or more external modules for analyzing constructs and injecting code.

A front end module 722 reads and performs lexical analysis upon the source code 710. Basically, the front end module 722 reads and translates a sequence of characters in the source code 710 into syntactic elements, or "tokens," indicating constants, identifiers, operator symbols, keywords, punctuation, etc.

A converter module 724 parses the tokens into an intermediate representation. For example, the converter module 724 checks syntax and groups tokens into expressions or other syntactic structures, which in turn coalesce into statement trees. Conceptually, these trees form a parse tree 732. As appropriate, the converter module 724 places entries into a symbol table 730 that lists symbol names and type information used in the file 710 along with related characteristics.

In particular, to handle recursive generators, the converter module 724 allows a "yield" construct (such as a "yield return" in C# or similar construct for starting/stopping processing and producing a value) to specify a "stream of T" (written as T*) as the type of information produced. For example, for a base data type T, the compiler allows a statement of the form "yield T" or "yield T*." Moreover, for such statements, at the type checking phase, the type T* is treated as equivalent to the type (T*)* or the type ((T*)*)* or any other arbitrary nesting of streams of T. Code fragment 14 shows an example of this. The type of the function FromTo is int*—stream of int. The statement "yield n" returns an int value, and the statement "yield FromTo(n+1, m)" returns a stream of int. Under certain compiler standards, a compiler would decide that this code contains an error because the code appears to yield a stream of a stream (of a stream, etc.) of integers, which is different than just stream of int. This type compatibility problem often arises when recursive calls are made to a function that produces a stream. So, the compiler 720 instead treats all of these nested "streams of" types as type "stream of int." The compiler 720 recognizes the statement "yield FromTo(n+1, m)" as a yield of a stream of int, and identifies a recursive iterator.

A state 734 tracks progress of the compiler 720 in processing the code 710 and forming the parse tree 732. For example, different state values indicate that the compiler 720 is at the start of a class definition or a function, has just declared a class member, or has completed an expression. As the compiler 720 progresses, it continually updates the state 734. The compiler 720 may partially or fully expose the state 734 to an outside entity, which can then provide input to the compiler 720.

Based upon constructs or other signals in the source code (or if the opportunity is otherwise recognized), the converter module 724 or another (e.g., outside) module injects code for implementing the fast stream flattening. Rules coded into the converter module 724 or other module indicate what must be done to implement the fast stream flattening, and identify locations where code is to be injected, or where other operations are to be carried out. "Injected code" typically includes added statements, metadata, or other elements at one or more locations, but this term also includes changing, deleting, or otherwise modifying existing source code. Injected code can be stored as one or more templates, or in some other form. In addition, symbol table manipulations and parse tree transformations may take place.

In the case of a C# compiler processing code for a recursive iterator, the converter module 724 or other module injects code for implementing the IEnumerable and IEnumerator interfaces of an enumerator object for the iterator. For example, the compiler injects MoveNext( ) method code for the enumerator object for processing with a stack a set of nested streams of the type for the collection of elements, as discussed above. (Note that for such code the compiler treats the type T* different from the type (T*)*, etc.) The compiler also performs other translations such as converting a caller for each loop construct into a while loop that calls the MoveNext( ) method of the enumerator object.

Based upon the symbol table 730 and the parse tree 732, a back end module 726 translates the intermediate representation of code 710 into output code. The back end module 726 converts the intermediate representation into instructions executable in a target processor, into memory allocations for variables, and so on. In FIG. 7, the output code is executable in a real processor, but in alternative embodiments the output code is executable in a virtual processor.

The front-end module 722 and the back-end module 726 can perform additional functions, such as code optimization, and can perform the described operations as a single phase or multiples phases. Various other aspects of the modules of the compiler 720 are conventional in nature, and can be substituted with modules performing equivalent functions. At various points during the processing of the source code 710, an error checker module 740 checks for errors such as errors in lexical structure, syntax errors, and even certain semantic errors.

VII. Computing Environment

Figure 8:
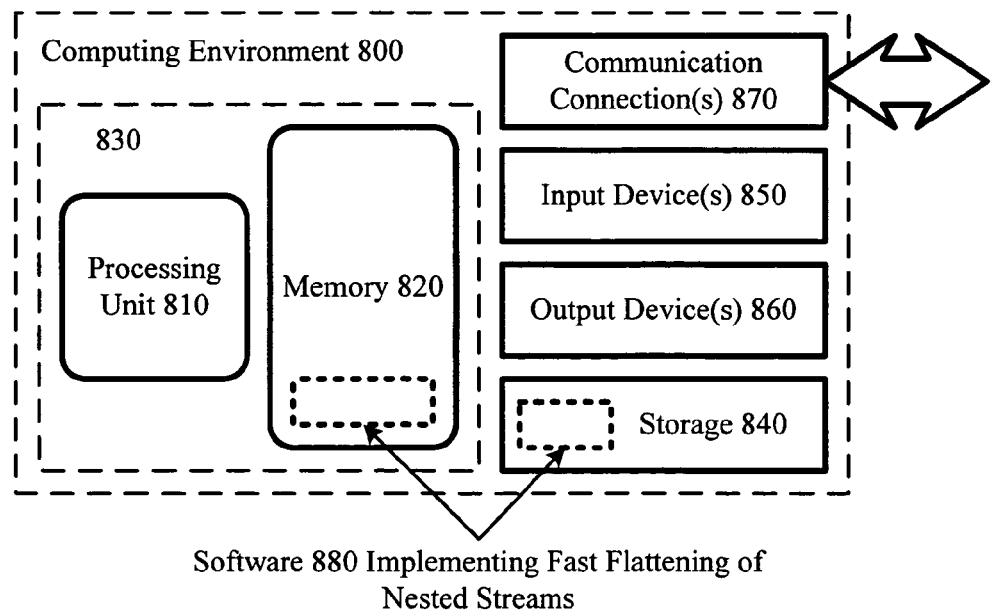
FIG. 8 is a block diagram of a suitable computing environment for implementing described embodiments.

The above described techniques can be implemented on any of a variety of computing devices and environments, including computers of various form factors (personal, workstation, server, handheld, laptop, tablet, or other mobile), distributed computing networks, and Web services, as a few general examples. FIG. 8 illustrates a generalized example of a suitable computing environment 800 in which the described techniques can be implemented. The computing environment 800 is not intended to suggest any limitation as to scope of use or functionality of the invention, as the present invention may be implemented in diverse general-purpose or special-purpose computing environments.

With reference to FIG. 8, the computing environment 800 includes at least one processing unit 810 and memory 820. In FIG. 8, this most basic configuration 830 is included within a dashed line. The processing unit 810 executes computer-executable instructions and may be a real or a virtual processor. In a multi-processing system, multiple processing units execute computer-executable instructions to increase processing power. The memory 820 may be volatile memory (e.g., registers, cache, RAM), non-volatile memory (e.g., ROM, EEPROM, flash memory, etc.), or some combination of the two. The memory 820 stores software 880 implementing the nested stream flattening tool.

A computing environment may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The storage 840 may be removable or non-removable, and includes magnetic disks, magnetic tapes or cassettes, CD-ROMs, CD-RWs, DVDs, or any other medium which can be used to store information and which can be accessed within the computing environment 800. The storage 840 stores instructions for the software 880 implementing the nested stream flattening tool.

The input device(s) 850 (e.g., for devices operating as a control point in a device connectivity architecture) may be a touch input device such as a keyboard, mouse, pen, or trackball, a voice input device, a scanning device, or another device that provides input to the computing environment 800. For audio, the input device(s) 850 may be a sound card or similar device that accepts audio input in analog or digital form, or a CD-ROM reader that provides audio samples to the computing environment. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The stream processing techniques herein can be described in the general context of computer-readable media. Computer-readable media are any available media that can be accessed within a computing environment. By way of example, and not limitation, with the computing environment 800, computer-readable media include memory 820, storage 840, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A computer-readable storage medium storing computer-executable instructions for causing a computer system programmed thereby to perform a method comprising:
   receiving source code, wherein the source code comprises an iterator method for incrementally computing and yielding a sequence of values, the iterator method comprising a yield statement, the yield statement returning a recursive call to the iterator method; and
   compiling the source code, wherein:
      the compiling produces enumerator instructions for processing a plurality of nested streams on a stack to produce an unnested stream,
      the plurality of nested streams includes one or more values,
      the enumerator instructions implement the iterator method using an enumerator object including a next function operable to return a return value, the enumerator object being specified by the compiling converting the yield statement into at least a portion of the enumerator instructions, the enumerator object operable to call the enumerator instructions for the yield statement no more than once unless the enumerator object is re-initialized,
      the next function implements the recursive call to the iterator method, the next function operable to return a value associated with the enumerator object as the return value or to return a new instance of an enumerator object as the return value, and
      the processing comprises, for each currently active stream of the plurality of nested streams:
         a) pushing a stack record for the currently active stream onto the stack, wherein the stack record comprises an enumerator object associated with the currently active stream; and
         b) iterating across the currently active stream when the stack record for the currently active stream is at the top of the stack, wherein the iterating across the currently active stream comprises:
            1) determining a next item of the currently active stream by executing the next function included with the enumerator object associated with the currently active stream and setting the next item to the return value of the next function,
            2) if the next item is a new instance of an enumerator object associated with a nested stream in the currently active stream, pushing a stack record for the next item on the stack,
            3) else if the next item is a value, producing the value as the next portion of a flattened unnested stream; and
         c) popping the stack record for the enumerator object associated with the currently active stream from the stack; and
         d) producing the flattened unnested stream.

2. The computer-readable storage medium of claim 1, wherein the iterating across the currently active stream further comprises, if the next item satisfies a condition, skipping the next item.

3. The computer-readable storage medium of claim 2, wherein the condition is that the next item is a null element.

4. The computer-readable storage medium of claim 2, wherein the condition is that the next item is an empty stream.

5. The computer-readable storage medium of claim 1, wherein the processing further includes:
   initializing the stack to have a stack record for a stream representing the entire plurality of nested streams at the top of the stack.

6. The computer-readable storage medium of claim 5, wherein a method of the enumerator instructions returns a reference to second enumerator instructions.

7. The computer-readable storage medium of claim 6, wherein the second enumerator instructions further comprise instructions to determine a point to commence invocation on a subsequent call to the second enumerator instructions.

8. The computer-readable storage medium of claim 1 wherein the plurality of nested streams include a tail stream in a parent stream, and wherein the processing comprises:
   handling the tail stream by popping the parent stream from the stack before pushing the tail stream onto the stack.

9. The computer-readable storage medium of claim 1 wherein the processing and the producing occur with less than quadratic complexity.

10. The computer-readable storage medium of claim 1, wherein each element in each stream is yielded a single time when the unnested stream is produced.

11. The computer-readable storage medium of claim 1, wherein the determining further comprises:
   referencing the enumerator object associated with the currently active stream by accessing the stack record for the currently active stream, and
   invoking the enumerator object associated with the currently active stream by commencing invocation of the enumerator object associated with the currently active stream at a point determined at least in part by a previous invocation of the enumerator object associated with the currently active stream.

12. The method of claim 1, wherein the recursive function is user-defined, and wherein the next function is non-recursive.

13. A computer-readable storage medium storing computer-executable instructions for causing a computer system programmed thereby to perform a method comprising:
   receiving source code for a stream generator, the source code comprising a recursive function comprising one or more yield statements, wherein at least one of the yield statements returns a recursive call to the recursive function; and
   converting the source code to computer-executable instructions for executing the stream generator, wherein the converting comprises converting the at least one of the yield statements into instructions for an enumerator object, wherein executing the computer-executable instructions for the stream generator comprises executing the enumerator object to produce a next element by:

determining whether the type of the next element to be returned will be a basic element or an instance of the enumerator object, if the type of the next element is determined to be a basic element, returning the basic element, and if the type of the next element is determined to be an instance of the enumerator object, returning the instance of the enumerator object, the enumerator object executable to produce a next element when evaluated by the receiver of the enumerator object;

wherein the executing the enumerator object is initiated when the enumerator object is evaluated by the receiver of the enumerator object, and wherein the executing the enumerator object can produce a second instance of the enumerator object as the next element; and wherein the executing the stream generator instructions produces a flattened unnested stream of elements from plural nested streams of elements, the flattening removing the nesting and leaving only the elements, and wherein execution of the stream generator instructions yields each of the elements of the stream at most once during execution.

14. The computer-readable storage medium of claim 13, wherein producing a flattened unnested stream of elements from plural nested streams of elements is performed in linear time.

15. In a computing device that implements a compiler, a method comprising:

with the computing device that implements the compiler, receiving source code comprising source code for at least one stream generator, wherein the source code comprises a next method including user-defined logic operable to return an enumerator object as the next object, the user-defined logic operable to return the enumerator object not more than once unless the enumerator object is re-initialized; and with the computing device that implements the compiler, compiling the source code for the at least one stream generator, wherein:

the compiling produces stream generator instructions, the stream generator instructions comprising a compiler-generated finite state machine for producing elements of the stream, the state machine operable to call the user-defined next method to determine the next object, producing plural enumerator objects, the state machine operable to produce each of the plural enumerator objects not more than once unless the state machine is re-initialized;

the stream generator instructions comprise instructions for producing a flattened unnested stream by processing a plurality of nested streams using plural enumerator objects, and each of the plural enumerator objects operable to produce a single next element of the stream for each call to one of the enumerator objects, at least one of the plural enumerator objects thereby operable to produce a second one of the plural enumerator objects as the single next element of the stream.

16. The method of claim 15, wherein the at least one stream generator is recursive.

17. The method of claim 15, wherein the each of plural calls to the enumerator comprises:

resuming execution of one of the enumerator objects at a position determined at least in part by a previously stored execution position of the enumerator object;

producing the next element of the stream; and storing a current execution position of the enumerator object as the previously stored execution position.

18. The method of claim 17, wherein the resuming execution of the enumerator object is deferred until the next element of the stream is required by instructions that invoke the stream generator instructions.

19. The method of claim 15, wherein the plurality of nested streams includes a tail stream in a parent stream, and wherein the processing comprises handling the tail stream by popping the parent stream from a stack before pushing the tail stream onto the stack.

20. The method of claim 15, wherein the compiling further comprises producing instructions for invoking the enumerator object.

21. The method of claim 15, further comprising storing the stream generator instructions in a computer-readable storage medium.

22. The method of claim 15, further comprising:

generating output computer-executable instructions for causing a computer system programmed thereby to process a plurality of nested streams, wherein the output computer-executable instructions are generated at least in part from the stream generator instructions.

23. The method of claim 22, further comprising storing the output computer-executable instructions in a computer readable storage medium.

* * * * *